(12) United States Patent
Abe et al.

(10) Patent No.: US 7,954,944 B2
(45) Date of Patent: Jun. 7, 2011

(54) SPECTACLE LENS AND METHOD FOR PRODUCING THE SAME

(75) Inventors: Osamu Abe, Yokohama (JP); Hidemoto Uekusa, Narita (JP); Fazlat Ali, Kawasaki (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 0 days.

(21) Appl. No.: 12/431,812

(22) Filed: Apr. 29, 2009

(65) Prior Publication Data

US 2009/0257022 A1 Oct. 15, 2009

Related U.S. Application Data

(63) Continuation of application No. PCT/JP2007/070282, filed on Oct. 17, 2007.

(30) Foreign Application Priority Data

Oct. 31, 2006 (JP) .................................. 2006-295129

(51) Int. Cl.
*G02C 7/02* (2006.01)
(52) U.S. Cl. .......................... 351/166; 351/163; 351/177
(58) Field of Classification Search .................. 351/163, 351/165, 166
See application file for complete search history.

(56) References Cited

U.S. PATENT DOCUMENTS

| 7,150,917 | B2* | 12/2006 | Takahashi et al. ............ 428/447 |
| 7,178,919 | B2* | 2/2007 | Kato et al. ..................... 351/166 |
| 7,241,472 | B2* | 7/2007 | Arai .............................. 427/162 |
| 2003/0139620 | A1 | 7/2003 | Yamaguchi et al. |
| 2005/0168685 | A1 | 8/2005 | Katagiri et al. |

FOREIGN PATENT DOCUMENTS

| JP | 9-258003 | 10/1997 |
| JP | 2003-238577 | 8/2003 |
| JP | 2005-3817 | 1/2005 |
| WO | WO 2006/107082 A3 | 10/2006 |
| WO | WO 2006/107083 A3 | 10/2006 |

* cited by examiner

*Primary Examiner* — Jordan M. Schwartz
(74) *Attorney, Agent, or Firm* — Finnegan Henderson Farabow Garrett & Dunner LLP

(57) ABSTRACT

The disclosure relates to a spectacle lens comprising: a lens base member; a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using, as raw materials: at least one kind of a first fluorine-substituted alkyl group-containing organosilicon compound and a second fluorine-substituted alkyl group-containing organosilicon compound. The disclosure also relates to methods of producing a spectacle lens that is capable of retaining a sufficient water-and-oil repellency over an extended period, and having sufficient edge processability.

13 Claims, 3 Drawing Sheets

SPECTACLE LENS AND METHOD FOR PRODUCING THE SAME

CROSS REFERENCE

This is a Continuation application of International Application No. PCT/JP2007/070282 filed on Oct. 17, 2007, which claims the benefit of Japanese Patent Application No. JP2006-295129 filed on Oct. 31, 2006. The entire disclosure of the prior application is hereby incorporated by reference herein in its entirely.

BACKGROUND OF THE INVENTION

1. Field of the Invention

The present invention relates to a spectacle lens and a method for producing the same.

2. Related Background Art

In recent years, a spectacle lens provided with a water-and-oil repellent layer on the surface of an anti-reflection film has been commercially available. The water-and-oil repellent layer makes the lens harder to stain or makes dirt adhered thereto easier to wipe off. Such a water-and-oil repellent layer is required to have not only a sufficient water-and-oil repellency in order to make the lens harder to stain or make dirt adhered thereto easier to wipe off, but also a long-lasting effect of the water-and-oil repellency (the durability of the water-and-oil repellent layer).

As a technique related to such a water-and-oil repellent layer, for example, Japanese Unexamined Patent Application Publication No. Hei 9-258003 (JP 9-258003 A) (Document 1) discloses an antifouling lens including a layer of a fluorine-substituted alkyl group-containing organosilicon compound having a molecular weight of $5 \times 10^2$ to $1 \times 10^5$ and expressed by the following general formula (1):

[Chemical formula 1]

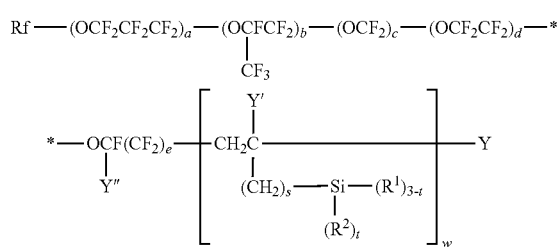

(in the formula (1): Rf represents a straight or branched perfluoroalkyl group having 1 to 16 carbon atoms; Y represents iodine or hydrogen; Y' represents hydrogen or a lower alkyl group; Y" represents fluorine or a trifluoromethyl group; $R^1$ represents a hydrolyzable group; $R^2$ represents hydrogen or an inactive monovalent organic group; a, b, c, and d each represent an integer of 0 to 200; e represents 0 or 1; s and t each represent an integer of 0 to 2; and w represents an integer of 1 to 10), the layer being formed on the surface of the lens.

Moreover, for example, International Publication No. 2006/107082 (WO 2006/107082 A) (Document 2) and International Publication No. 2006/107083 (WO 2006/107083 A) (Document 3) disclose a fluorine-substituted alkyl group-containing organosilicon compound as a surface treating agent of an optical member, the compound being expressed by any one of the following general formulae (2) to (5)

[Chemical formula 2]

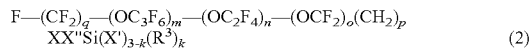

[Chemical formula 3]

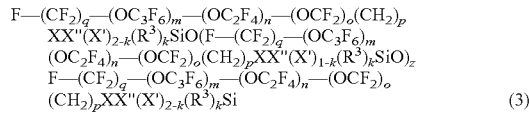

[Chemical formula 4]

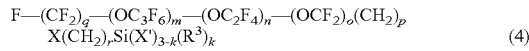

[Chemical formula 5]

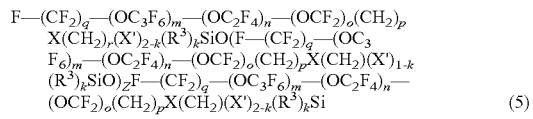

(in the formulae (2) to (5): X represents oxygen or a divalent organic group; X' represents a hydrolyzable group; X" represents a divalent organosilicone group; $R^3$ represents a straight or branched alkylene group having 1 to 22 carbon atoms; q represents an integer of 1 to 3; m, n, and o each represent an integer of 0 to 200; p represents 1 or 2; r represents an integer of 2 to 20; k represents an integer of 0 to 2; and z represents an integer of 0 to 10 with the proviso that k is 0 or 1).

Furthermore, Japanese Unexamined Patent Application Publication No. 2003-238577 (JP 2003-238577 A) (Document 4) discloses a fluorine-substituted alkyl group-containing organosilicon compound expressed by the following general formula (6):

[Chemical formula 6]

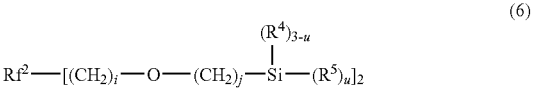

(in the formula (6): $Rf^2$ represents a divalent straight perfluoropolyether group; $R^4$ represents a phenyl group or an alkyl group having 1 to 4 carbon atoms; $R^5$ represents a hydrolyzable group; i represents an integer of 0 to 2; j represents an integer of 1 to 5; and u represents 2 or 3).

Although it is hard to stain a spectacle lens including a water-and-oil repellent layer made by using, as a raw material, a fluorine-substituted alkyl group-containing organosilicon compound as described in those documents and the like and it is easy to wipe off dirt adhered to the lens, the lens has the following problem. Specifically, the spectacle lens generally has a circular shape, and is subjected to a so-called edge processing in which the spectacle lens is processed to have a shape matching the frame of a spectacle frame at an eyewear shop or the like. In this edge processing, the edge of the spectacle lens is ground with a grinding stone while the spectacle lens is being held by a method which the optical center of the spectacle lens is sucked and held by a chuck of an edging machine, or by pressure from a concave surface side of the lens with a lens lock cap fixed to the optical center on a convex surface of the spectacle lens with a double-faced adhesive tape. During such an edge processing, since the spectacle lens has a slippery surface, an axis deviation is caused in which the center of the lens shifts by the grinding pressure of the grinding stone at the time of grinding with the grinding stone. For this reason, the edge processing cannot be performed accurately.

On the other hand, as a technique for achieving both the edge processability and the durability of the water-and-oil repellent layer, for example, Japanese Unexamined Patent Application Publication No. 2005-3817 (JP 2005-3817 A) (Document 5) discloses an antifouling spectacle lens including an antifouling layer formed on a surface of the spectacle lens with two or more kinds of silane compounds including at least one or more kinds of fluorine-substituted alkyl group-containing organosilicon compounds, the antifouling spectacle lens characterized in that, among the dynamic friction coefficients of lens surfaces each formed by one of the two or more kinds of silane compounds as a single component, the highest dynamic friction coefficient value is 1.4 times or more than the lowest dynamic friction coefficient value. In the specification, it is stated that a fluorine-substituted alkyl group-containing organosilicon compound expressed by the above general formula (1) is used as at least one kind of the silane compounds.

SUMMARY OF THE INVENTION

However, the edge processability of a spectacle lens as described in Document 5 is improved by reducing the slipperiness of the spectacle lens surface. This is achieved by using, as the raw material, the mixture of: the fluorine-substituted alkyl group-containing organosilicon compound which is expressed by the above general formula (1), and which provides a surface with a low dynamic friction coefficient; and the silane compound which provides a surface with a high dynamic friction coefficient. For this reason, such a spectacle lens has a problem of reducing the slipperiness and the water-and-oil repellency that the fluorine-substituted alkyl group-containing organosilicon compound intrinsically has. Moreover, such a spectacle lens is still far from always achieving satisfactory levels in terms of both the durability of the water-and-oil repellent layer and the edge processability.

The present invention has been made in consideration of the above-described problems in the conventional techniques. An object of the present invention is to provide: a spectacle lens capable of retaining a sufficient water-and-oil repellency over an extended period, furthermore the spectacle lens having a sufficient edge processability; and a method for producing the spectacle lens.

The present inventors have earnestly studied in order to achieve the above object. As a result, the inventors have revealed the following facts. Specifically, in a spectacle lens including a water-and-oil repellent layer, a particular first fluorine-substituted alkyl group-containing organosilicon compound selected from numerous fluorine-substituted alkyl group-containing organosilicon compounds and a particular second fluorine-substituted alkyl group-containing organosilicon compound selected from numerous fluorine-substituted alkyl group-containing organosilicon compounds are used in combination as the raw material of the water-and-oil repellent layer. Thereby, to our surprise, it becomes possible to obtain a spectacle lens capable of retaining a sufficient water-and-oil repellency over an extended period, furthermore the spectacle lens having a sufficient edge processability. This discovery has led the inventors to complete the present invention.

Specifically, a spectacle lens of the present invention comprises:

a lens base member;

a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using, as raw materials: at least one kind of a first fluorine-substituted alkyl group-containing organosilicon compound; and a second fluorine-substituted alkyl group-containing organosilicon compound, the first fluorine-substituted alkyl group-containing organosilicon compound being selected from the group consisting of a fluorine-substituted alkyl group-containing organosilicon compound expressed by the following general formula (1):

[Chemical formula 7]

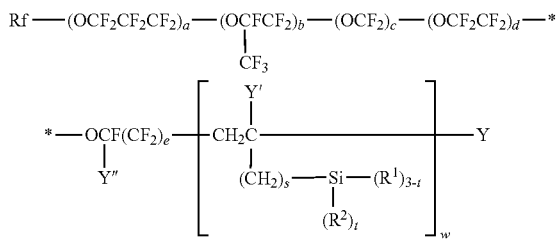

(in the formula (1): Rf represents a straight or branched perfluoroalkyl group having 1 to 16 carbon atoms; Y represents any one of iodine and hydrogen; Y' represents any one of hydrogen and a lower alkyl group; Y" represents any one of fluorine and a trifluoromethyl group; $R^1$ represents a hydrolyzable group; $R^2$ represents any one of hydrogen and an inactive monovalent organic group; a, b, c, and d each represent an integer of 0 to 200; e represents any one of 0 and 1; s and t each represent an integer of 0 to 2; and w represents an integer of 1 to 10) and fluorine-substituted alkyl group-containing organosilicon compounds expressed by the following general formulae (2) to (5):

[Chemical formula 8]

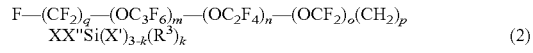

[Chemical formula 9]

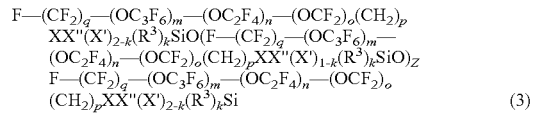

[Chemical formula 10]

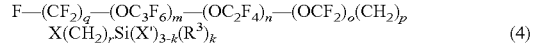

[Chemical formula 11]

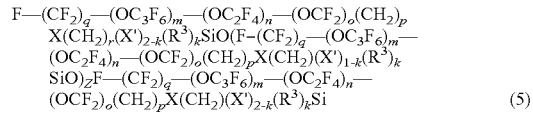

(in the formulae (2) to (5): X represents any one of oxygen and a divalent organic group; X' represents a hydrolyzable group; X" represents a divalent organosilicone group; $R^3$ represents a straight or branched alkylene group having 1 to 22 carbon atoms; q represents an integer of 1 to 3; m, n, and o each represent an integer of 0 to 200; p represents any one of 1 and 2; r represents an integer of 2 to 20; k represents an integer of 0 to 2; and z represents an integer of 0 to 10 with the proviso that k is any one of 0 and 1), and the second fluorine-substituted alkyl group-containing organosilicon compound being expressed by the following general formula (6):

[Chemical formula 12]

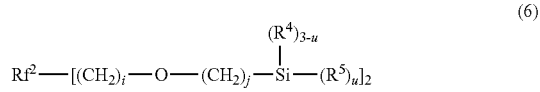

(6)

(in the formula (6): $Rf^2$ represents a divalent straight perfluoropolyether group; $R^4$ represents any one of a phenyl group and an alkyl group having 1 to 4 carbon atoms; $R^5$ represents a hydrolyzable group; i represents an integer of 0 to 2; j represents an integer of 1 to 5; and u represents any one of 2 and 3).

Additionally, in the spectacle lens of the present invention, the water-and-oil repellent layer preferably includes: a first layer provided in contact with the outermost layer of the multi-layered anti-reflection film, and made by using the first fluorine-substituted alkyl group-containing organosilicon compound as a main raw material; and a second layer provided in contact with the first layer, and made by using the second fluorine-substituted alkyl group-containing organosilicon compound as a main raw material.

Furthermore, the spectacle lens of the present invention may further comprise: either a hard coat layer, or a primer layer and a hard coat layer, between the lens base member and the multi-layered anti-reflection film.

Moreover, in the spectacle lens of the present invention, the first and the second fluorine-substituted alkyl group-containing organosilicon compounds each preferably have an average molecular weight of 1000 to 10000.

Furthermore, in the spectacle lens of the present invention, the water-and-oil repellent layer preferably has a thickness of 5 to 30 nm.

A method for producing a spectacle lens of the present invention comprises the steps of:

obtaining an anti-reflection film-attached lens by forming a multi-layered anti-reflection film on a lens base member, the multi-layered anti-reflection film including a layer mainly made of silicon dioxide as an outermost layer; and forming a water-and-oil repellent layer on the anti-reflection film-attached lens, the water-and-oil repellent layer being made by using, as raw materials: at least one kind of a first fluorine-substituted alkyl group-containing organosilicon compound; and a second fluorine-substituted alkyl group-containing organosilicon compound, the first fluorine-substituted alkyl group-containing organosilicon compound being selected from the group consisting of a fluorine-substituted alkyl group-containing organosilicon compound expressed by the following general formula (1):

[Chemical formula 13]

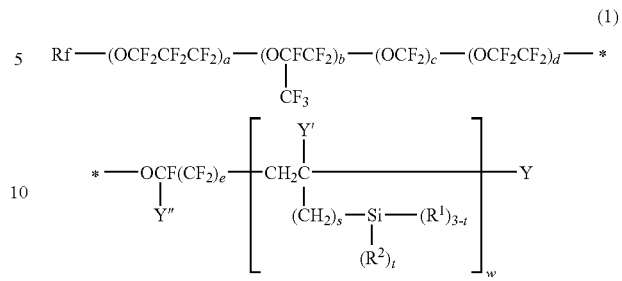

(1)

(in the formula (1): Rf represents a straight or branched perfluoroalkyl group having 1 to 16 carbon atoms; Y represents any one of iodine and hydrogen; Y' represents any one of hydrogen and a lower alkyl group; Y" represents any one of fluorine and a trifluoromethyl group; $R^1$ represents a hydrolyzable group; $R^2$ represents any one of hydrogen and an inactive monovalent organic group; a, b, c, and d each represent an integer of 0 to 200; e represents any one of 0 and 1; s and t each represent an integer of 0 to 2; and w represents an integer of 1 to 10) and fluorine-substituted alkyl group-containing organosilicon compounds expressed by the following general formulae (2) to (5):

[Chemical formula 14]

(2)

[Chemical formula 15]

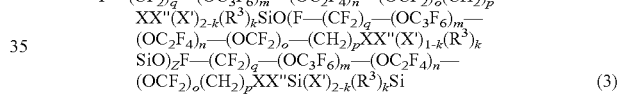

(3)

[Chemical formula 16]

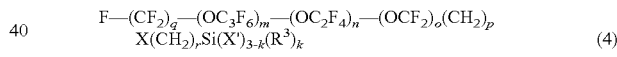

(4)

[Chemical formula 17]

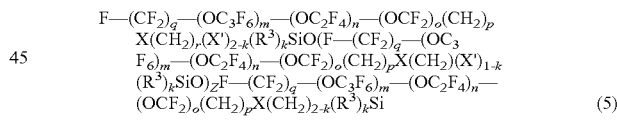

(5)

(in the formulae (2) to (5): X represents any one of oxygen and a divalent organic group; X' represents a hydrolyzable group; X" represents a divalent organosilicone group; $R^3$ represents a straight or branched alkylene group having 1 to 22 carbon atoms; q represents an integer of 1 to 3; m, n, and o each represent an integer of 0 to 200; p represents any one of 1 and 2; r represents an integer of 2 to 20; k represents an integer of 0 to 2; and z represents an integer of 0 to 10 with the proviso that k is any one of 0 and 1), and the second fluorine-substituted alkyl group-containing organosilicon compound being expressed by the following general formula (6):

[Chemical formula 18]

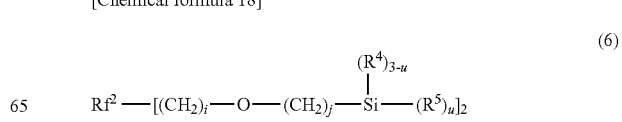

(6)

(in the formula (6): $Rf^2$ represents a divalent straight perfluoropolyether group; $R^4$ represents anyone of a phenyl group and an alkyl group having 1 to 4 carbon atoms; $R^5$ represents a hydrolyzable group; i represents an integer of 0 to 2; j represents an integer of 1 to 5; and u represents any one of 2 and 3).

In addition, in the method for producing a spectacle lens of the present invention, the step of forming the water-and-oil repellent layer may be a step of forming the water-and-oil repellent layer by preparing a solution containing the first fluorine-substituted alkyl group-containing organosilicon compound and the second fluorine-substituted alkyl group-containing organosilicon compound; by coating a surface of the anti-reflection film-attached lens with the solution; and by drying the surface.

Furthermore, in the method for producing a spectacle lens of the present invention, the step of forming the water-and-oil repellent layer may be a step of forming the water-and-oil repellent layer on a surface of the anti-reflection film-attached lens by evaporating the first fluorine-substituted alkyl group-containing organosilicon compound and the second fluorine-substituted alkyl group-containing organosilicon compound in a vacuum chamber.

Moreover, in the method for producing a spectacle lens of the present invention, the step of forming the water-and-oil repellent layer may be a step of forming, on a surface of the anti-reflection film-attached lens, the water-and-oil repellent layer including a first layer made by using the first fluorine-substituted alkyl group-containing organosilicon compound as a main raw material, and a second layer made by using the second fluorine-substituted alkyl group-containing organosilicon compound as a main raw material, by evaporating the first fluorine-substituted alkyl group-containing organosilicon compound in a vacuum chamber to thereby form the first layer on the surface of the anti-reflection film-attached lens; and then by evaporating the second fluorine-substituted alkyl group-containing organosilicon compound in the vacuum chamber to thereby form the second layer on a surface of the first layer.

Furthermore, in the method for producing a spectacle lens of the present invention, a surface of the lens base member may be provided with:

a hard coat layer; or a primer layer and a hard coat layer.

Additionally, another method for producing a spectacle lens of the present invention is a method for producing a spectacle lens that comprises:

a lens base member;

a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using at least two kinds of fluorine-substituted alkyl group-containing organosilicon compounds as raw materials, the method comprising the steps of:

obtaining an anti-reflection film-attached lens by forming the multi-layered anti-reflection film on the lens base member; and forming, on a surface of the anti-reflection film-attached lens, the water-and-oil repellent layer including a first layer made by using a first fluorine-substituted alkyl group-containing organosilicon compound as a main raw material, and a second layer made by using a second fluorine-substituted alkyl group-containing organosilicon compound as a main raw material, by evaporating the first and the second fluorine-substituted alkyl group-containing organosilicon compounds in a vacuum chamber sequentially with a certain time lag to thereby form the first layer on a surface of the anti-reflection film-attached lens, and to form the second layer on a surface of the first layer.

Furthermore, in the method for producing a spectacle lens of the present invention, in forming the water-and-oil repellent layer, at least one container may be placed on a heat generating medium in the vacuum chamber, the container including material-filling spaces which are formed at two or more positions different in distance from the heat generating medium when the container is placed on the heat generating medium, and the first and the second fluorine-substituted alkyl group-containing organosilicon compounds may be stored respectively in the material-filling spaces so as to cause a time lag in the evaporation of the first and the second fluorine-substituted alkyl group-containing organosilicon compounds.

According to the present invention, it is possible to provide: a spectacle lens capable of retaining a sufficient water-and-oil repellency over an extended period, furthermore the spectacle lens having a sufficient edge processability; and a method for producing the spectacle lens.

DETAILED DESCRIPTION OF THE PREFERRED EMBODIMENTS

Figure 1:
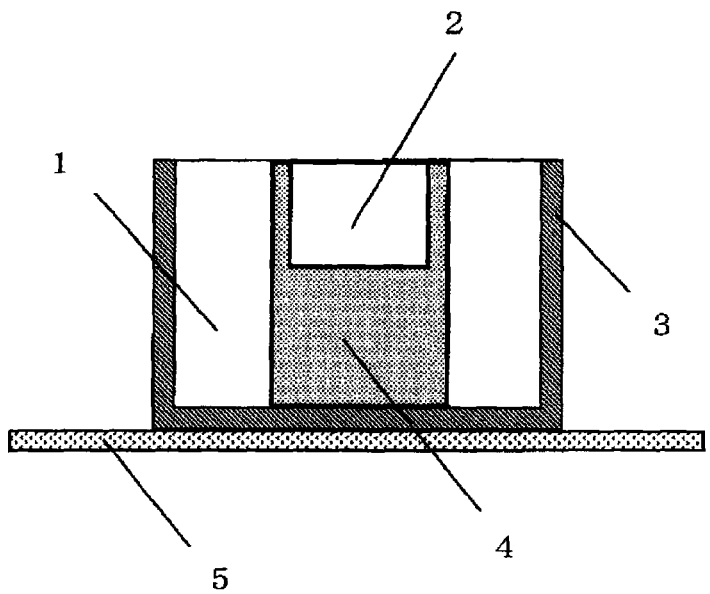
FIG. 1 is a schematic cross-sectional view showing a state where a container for filling a material is placed on a heat generating medium when a spectacle lens of the present invention is produced by a vacuum deposition method.

Hereinafter, the present invention is described in details with reference to preferred embodiments thereof.

First, a spectacle lens of the present invention is described. Specifically, the spectacle lens of the present invention comprises: a lens base member; a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using, as raw materials: at least one kind of a first fluorine-substituted alkyl group-containing organosilicon compound selected from the group consisting of fluorine-substituted alkyl group-containing organosilicon compounds expressed by the above general formulae (1) to (5); as well as a second fluorine-substituted alkyl group-containing organosilicon compound expressed by the above general formula (6).

The lens base member according to the present invention may be made of an inorganic glass, or may be made of a plastic. Examples of such a plastic include a diethylene glycol bis allyl carbonate (CR-39) resin, a polythiourethane resin, a polycarbonate resin, a polyacrylic resin, and a polyepisulfide resin.

The multi-layered anti-reflection film according to the present invention is a film including multiple inorganic oxide layers. Such an inorganic oxide used is preferably capable of being vacuum-deposited at a low temperature. Examples of the inorganic oxide include $SiO_2$, $ZrO_2$, $TiO_2$, $Ta_2O_5$, and $Nb_2O_5$. Moreover, such a multi-layered anti-reflection film needs to include a layer mainly made of silicon dioxide ($SiO_2$) as the outermost layer. The provision of such an outermost layer with the water-and-oil repellent layer to be described below can improve the durability of the water-and-oil repellent layer.

The water-and-oil repellent layer according to the present invention is a layer provided in contact with the outermost layer of the multi-layered anti-reflection film and made by using a first fluorine-substituted alkyl group-containing organosilicon compound and a second fluorine-substituted alkyl group-containing organosilicon compound as raw materials. In this manner, a particular first fluorine-substituted alkyl group-containing organosilicon compound and a particular second fluorine-substituted alkyl group-containing organosilicon compound are used in combination as the raw materials of the water-and-oil repellent layer. Thereby, it becomes possible to obtain a spectacle lens capable of retaining a sufficient water-and-oil repellency over an extended period, furthermore the spectacle lens having a sufficient edge processability.

The first fluorine-substituted alkyl group-containing organosilicon compound according to the present invention is at least one kind of a fluorine-substituted alkyl group-containing organosilicon compound selected from the group consisting of fluorine-substituted alkyl group-containing organosilicon compounds expressed by the general formulae (1) to (5) to be described below.

[Chemical formula 19]

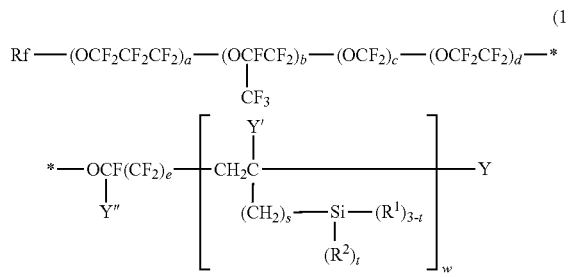

(1)

In the general formula (1), Rf represents a straight or branched perfluoroalkyl group having 1 to 16 carbon atoms. As such a perfluoroalkyl group, $CF_3-$, $C_2F_5-$, or $C_3F_7-$ are preferable. Y represents any one of iodine and hydrogen. Y' represents any one of hydrogen and a lower alkyl group. Y" represents any one of fluorine and a trifluoromethyl group. $R^1$ represents a hydrolyzable group. As such a hydrolyzable group, a halogen, $-OR^6$, $-OCOR^6$, $-OC(R^6)=C(R^7)_2$, $-ON=C(R^6)_2$, or $-ON=CR^8$ is preferable. Here, $R^6$ represents any one of an aliphatic hydrocarbon group and an aromatic hydrocarbon group; $R^7$ represents any one of hydrogen and a lower aliphatic hydrocarbon group; and $R^8$ represents a divalent aliphatic hydrocarbon group having 3 to 6 carbon atoms. Moreover, $R^2$ represents any one of hydrogen and an inactive monovalent organic group. As such an inactive monovalent organic group, a monovalent hydrocarbon group having 1 to 4 carbon atoms is preferable. Furthermore, a, b, c, and d each represent an integer of 0 to 200; e represents 0 or 1; s and t each represent an integer of 0 to 2; and w represents an integer of 1 to 10.

[Chemical formula 20]

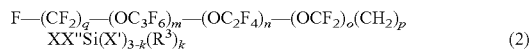

(2)

[Chemical formula 21]

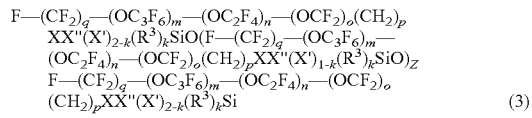

(3)

[Chemical formula 22]

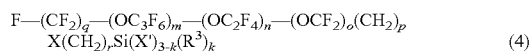

(4)

[Chemical formula 23]

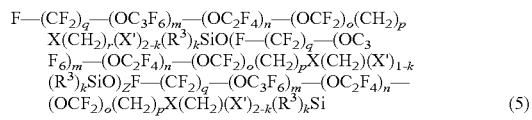

(5)

In the general formulae (2) to (5), X represents oxygen or a divalent organic group. Such a divalent organic group includes a straight or branched alkylene group having 1 to 22 carbon atoms. X' represents a hydrolyzable group. As the hydrolyzable group, a halogen, $-OR^6$, $-OCOR^6$, $-OC(R^6)=C(R^7)_2$, $-ON=C(R^6)_2$, or $-ON=CR^8$ is preferable. Here, $R^6$ represents any one of an aliphatic hydrocarbon group and an aromatic hydrocarbon group; $R^7$ represents any one of hydrogen and a lower aliphatic hydrocarbon group; and $R^8$ represents a divalent aliphatic hydrocarbon group having 3 to 6 carbon atoms. Furthermore, X" represents a divalent organosilicone group. Herein, an organosilicone group refers to a group having at least one siloxane group and at least one methylene group. Moreover, $R^3$ represents a straight or branched alkylene group having 1 to 22 carbon atoms. Furthermore, q represents an integer of 1 to 3; m, n, and each represent an integer of 0 to 200; p represents 1 or 2; r represents an integer of 2 to 20; k represents an integer of 0 to 2; and z represents an integer of 0 to 10 with the proviso that k is 0 or 1.

Such a first fluorine-substituted alkyl group-containing organosilicon compound has a functional group capable of chemically bonding to the surface of the anti-reflection film, the functional group locating at one terminal of the straight perfluoroalkyl group. Moreover, the surface treated with such a first fluorine-substituted alkyl group-containing organosilicon compound has: a high contact angle (for example, 110° to 116°) with water; and a slippery characteristic due to a significantly small friction coefficient. Furthermore, such a surface is excellent in rubbing durability against a cloth (fabric), particularly.

Moreover, such a first fluorine-substituted alkyl group-containing organosilicon compound has an average molecular weight preferably ranging from 1000 to 10000, and more preferably ranging from 2000 to 8000. If the average molecular weight is less than the lower limit, the water-and-oil repellency tends to be insufficient. On the other hand, if the average molecular weight exceeds the upper limit, the film formation by vapor deposition tends to be difficult.

Examples of such a first fluorine-substituted alkyl group-containing organosilicon compound include those described in JP 9-258003 A, WO 2006/107082 A, and WO 2006/107083 A. Moreover, these first fluorine-substituted alkyl group-containing organosilicon compounds can be used alone or in combination of two or more kinds. Incidentally, an example of a commercially-available first fluorine-substituted alkyl group-containing organosilicon compound is OPTOOL AES4 manufactured by DAIKIN INDUSTRIES, LTD.

The second fluorine-substituted alkyl group-containing organosilicon compound according to the present invention is a fluorine-substituted alkyl group-containing organosilicon compound expressed by the following general formula (6).

[Chemical formula 24]

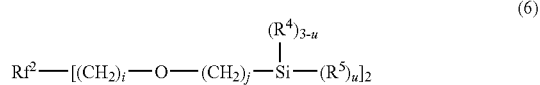

(6)

In the general formula (6), $Rf^2$ represents a divalent straight perfluoropolyether group. Such a perfluoropolyether group is preferably a divalent straight perfluoropolyether group having a repeating unit of a perfluoropolyether group having 1 to 4 carbon atoms. Moreover, $R^4$ represents a phenyl group or an alkyl group having 1 to 4 carbon atoms. $R^5$ represents a hydrolyzable group. As the hydrolyzable group, a halogen, $-OR^6$, $-OCOR^6$, $-OC(R^6)=C(R^7)_2$, $-ON=C(R^6)_2$, or $-ON=CR^8$ is preferable. Here, $R^6$ represents any one of an aliphatic hydrocarbon group and an aromatic hydrocarbon group; $R^7$ represents any one of hydrogen and a lower aliphatic hydrocarbon group; and $R^8$ represents a divalent aliphatic hydrocarbon group having 3 to 6 carbon atoms. Furthermore, i represents an integer of 0 to 2; j represents an integer of 1 to 5; and u represents 2 or 3.

Such a second fluorine-substituted alkyl group-containing organosilicon compound has functional groups capable of chemically bonding to the surface of the anti-reflection film, the functional groups locating at both terminals of the divalent straight perfluoroether group. Moreover, the surface treated with such a second fluorine-substituted alkyl group-containing organosilicon compound has, as similar to the first fluorine-substituted alkyl group-containing organosilicon compound: a high contact angle (for example, 105° to 110°); and a slippery characteristic due to a significantly small friction coefficient. Furthermore, such a surface is excellent in rubbing durability against a paper (sheet), particularly.

Moreover, such a second fluorine-substituted alkyl group-containing organosilicon compound has an average molecular weight preferably ranging from 1000 to 10000, and more preferably ranging from 2000 to 8000. If the average molecular weight is less than the lower limit, the water-and-oil repellency tends to be insufficient. On the other hand, if the average molecular weight exceeds the upper limit, the film formation by vapor deposition tends to be difficult.

Examples of such a second fluorine-substituted alkyl group-containing organosilicon compound include those described in JP 2003-238577 A. Moreover, these second fluorine-substituted alkyl group-containing organosilicon compounds can be used alone or in combination of two or more kinds. Incidentally, an example of a commercially-available second fluorine-substituted alkyl group-containing organosilicon compound is KY-130 manufactured by Shin-Etsu Chemical Co., Ltd.

In the water-and-oil repellent layer described above, the mass ratio of the first fluorine-substituted alkyl group-containing organosilicon compound and the second fluorine-substituted alkyl group-containing organosilicon compound (the first/the second) preferably ranges from 1/99 to 99/1, and more preferably ranges from 10/90 to 90/10.

Moreover, such a water-and-oil repellent layer preferably has a thickness ranging from 5 to 30 nm, and more preferably ranging from 10 to 25 nm. If the thickness of the water-and-oil repellent layer is less than the lower limit, the durability of the water-and-oil repellent layer tends to be insufficient. On the other hand, if the thickness exceeds the upper limit, a clouding may be formed slightly in the plastic spectacle lens, and also the risk of an axis deviation tends to increase at the time of an edge processing.

Furthermore, such a water-and-oil repellent layer may be a single layer made by using, as a raw material, a mixture of the first fluorine-substituted alkyl group-containing organosilicon compound and the second fluorine-substituted alkyl group-containing organosilicon compound. Alternatively, the water-and-oil repellent layer may include such multiple layers. It should be noted that, since such a water-and-oil repellent layer has both of the characteristics of the above-described surfaces treated with the first and the second fluorine-substituted alkyl group-containing organosilicon compounds, the water-and-oil repellent layer is capable of retaining a sufficient water-and-oil repellency over an extended period, and has a sufficient edge processability.

When such a water-and-oil repellent layer includes the multiple layers, the water-and-oil repellent layer preferably, from the viewpoint of further improvement in the durability of the water-and-oil repellent layer and the edge processability, includes: a first layer provided in contact with the outermost layer of the multi-layered anti-reflection film, and made by using the first fluorine-substituted alkyl group-containing organosilicon compound as a main raw material; and a second layer provided in contact with the first layer, and made by using the second fluorine-substituted alkyl group-containing organosilicon compound as a main raw material. Additionally, when the water-and-oil repellent layer includes the multiple layers in this manner, the water-and-oil repellent layer may further include, between the first layer and the second layer, a layer made by using the first fluorine-substituted alkyl group-containing organosilicon compound and/or the second fluorine-substituted alkyl group-containing organosilicon compound as raw materials.

The spectacle lens of the present invention comprises the lens base member, the multi-layered anti-reflection film, and the water-and-oil repellent layer. Additionally, the spectacle lens of the present invention may further comprise a hard coat layer between the lens base member and the multi-layered anti-reflection film. Such a hard coat layer is a layer provided to improve the abrasion resistance of the spectacle lens. Moreover, when such a hard coat layer is formed, a primer layer may further be provided between the lens base member and the hard coat layer, as necessary. The formation of such a primer layer can improve the adhesion between the hard coat layer formed thereon and the lens base member, and can also improve the shock resistance.

Moreover, an example of the material of such a hard coat layer is a mixture of a silicon resin and a sol of inorganic particles. Furthermore, an example of the silicon resin includes one obtained by heat-hardening a hydrolysis condensation product of an alkoxysilane. In addition, examples of the material of such a primer layer include a urethanebased resin, an epoxy-based resin, a polyester-based resin, a melanin-based resin, and a primer composition mainly containing polyvinyl acetal.

Next, a method for producing a spectacle lens of the present invention is described. The method for producing a spectacle lens of the present invention is a method comprising:

a step (first step) of forming a multi-layered anti-reflection film on a lens base member to thereby obtain an anti-reflection film-attached lens, the multi-layered anti-reflection film including a layer mainly made of silicon dioxide as an outermost layer; and a step (second step) of forming a water-and-oil repellent layer on the anti-reflection film-attached lens, the water-and-oil repellent layer being made by using, as raw materials: at least one kind of a first fluorine-substituted alkyl group-containing organosilicon compound selected from the group consisting of fluorine-substituted alkyl group-containing organosilicon compounds expressed by the above general formulae (1) to (5); as well as a second fluorine-substituted alkyl group-containing organosilicon compound expressed by the above general formula (6).

In the first step, a multi-layered anti-reflection film including a layer mainly made of silicon dioxide as an outermost layer is formed on a lens base member to thereby obtain an anti-reflection film-attached lens. As examples of a method of forming the multi-layered anti-reflection film on the lens base member in this manner, a vacuum deposition method, an ion plating method, a sputtering method, and a CVD method can be used. The vacuum deposition method is preferably used. Moreover, such a lens base member to be used may be provided with a hard coat layer or a primer layer and a hard coat layer on the surface of the lens base member. Note that, as a method of forming the primer layer and the hard coat layer, a known method can be used as appropriate.

In the second step, first, at least one kind of a first fluorine-substituted alkyl group-containing organosilicon compound selected from the group consisting of the fluorine-substituted alkyl group-containing organosilicon compounds expressed by the above general formulae (1) to (5) and the second fluorine-substituted alkyl group-containing organosilicon compound expressed by the above general formula (6) are prepared. Then, a water-and-oil repellent layer is formed on the anti-reflection film-attached lens, using these fluorine-substituted alkyl group-containing organosilicon compounds as raw materials. As a method of forming the water-and-oil repellent layer in this manner, for example, a method with a wet method such as a dipping method, a spin coating method, and a spray method, as well as a method with a dry method such as a vacuum deposition method can be used.

The method of forming the water-and-oil repellent layer with such a wet method is described while the method with the dipping method is taken as an example. In the method with such a dipping method, first, a solution containing the first fluorine-substituted alkyl group-containing organosilicon compound and the second fluorine-substituted alkyl group-containing organosilicon compound is prepared. Examples of an organic solvent used in such a solution include perfluorohexane, perfluoro-4-methoxybutane, perfluoro-4-ethoxybutane, and meta-xylene hexafluoride.

Moreover, such a solution preferably has a concentration ranging from 0.01 to 0.5% by mass, and more preferably ranging from 0.03 to 0.1% by mass. If the concentration is less than the lower limit, the thickness of the water-and-oil repellent layer tends to be insufficient. On the other hand, if the concentration exceeds the upper limit, the solution tends to be applied unevenly, causing the material cost to increase.

In the method with such a dipping method, subsequently, the anti-reflection film-attached lens is dipped into the solution, and thereafter pulled out from there under a certain condition. Thereby, the anti-reflection film-attached lens is coated with the solution. Then, the lens is dried to form the water-and-oil repellent layer on the anti-reflection film-attached lens. Here, the dipping time and the pulling speed can be selected appropriately in accordance with the thickness of the water-and-oil repellent layer. Moreover, it is only necessary as the drying condition that the water-and-oil repellent layer be stabilized.

Meanwhile, the method of forming the water-and-oil repellent layer with the above dry method is described while the method with the vacuum deposition method is taken as an example. In the method with such a vacuum deposition method, first, the first fluorine-substituted alkyl group-containing organosilicon compound and the second fluorine-substituted alkyl group-containing organosilicon compound are prepared. At this point, it is preferable that these fluorine-substituted alkyl group-containing organosilicon compounds be dried sufficiently. Then, these fluorine-substituted alkyl group-containing organosilicon compounds are evaporated in a vacuum chamber to form the water-and-oil repellent layer on the surface of the anti-reflection film-attached lens.

Moreover, according to such a vacuum deposition method, the water-and-oil repellent layer including multiple layers can be formed on the surface of the anti-reflection film-attached lens. For example, the first fluorine-substituted alkyl group-containing organosilicon compound is evaporated in the vacuum chamber to thereby form a first layer on the surface of the anti-reflection film-attached lens, the first layer being made by using the first fluorine-substituted alkyl group-containing organosilicon compound as a main raw material. Then, the second fluorine-substituted alkyl group-containing organosilicon compound is evaporated in the vacuum chamber to thereby form a second layer on the surface of the first layer, the second layer being made by using the second fluorine-substituted alkyl group-containing organosilicon compound as a main raw material. Thus, the water-and-oil repellent layer including the first layer and the second layer can be formed on the surface of the anti-reflection film-attached lens.

Meanwhile, the spectacle lens of the present invention can be produced by the following method. Specifically, the method is for producing a spectacle lens that includes:

a lens base member;

a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using at least two kinds of fluorine-substituted alkyl group-containing organosilicon compounds as raw materials, the method comprising the steps of:

forming the multi-layered anti-reflection film on the lens base member to thereby obtain an anti-reflection film-attached lens; and forming the water-and-oil repellent layer, including a first layer and a second layer, on a surface of the anti-reflection film-attached lens, by evaporating first and second fluorine-substituted alkyl group-containing organosilicon compounds in a vacuum chamber sequentially with a certain time lag, so that the first layer made by using the first fluorine-substituted alkyl group-containing organosilicon compound as a main raw material is formed on a surface of the anti-reflection film-attached lens, and that the second layer made by using the second fluorine-substituted alkyl group-containing organosilicon compound as a main raw material is formed on a surface of the first layer. Thus, the spectacle lens of the present invention can be produced.

An example of performing such a method is as follows. The vacuum chamber includes heat generating media at two or more positions, the heat generating media being capable of controlling the heating independently of each other. In the vacuum chamber, a container filled with the first fluorine-substituted alkyl group-containing organosilicon compound or a mixture thereof is placed on a first heat generating medium thereamong. Moreover, a container filled with the second fluorine-substituted alkyl group-containing organosilicon compound or a mixture thereof is placed on a second heat generating medium thereamong. Thereafter, firstly, the first heat generating medium is heated. After a certain time lag, the second heat generating medium is heated. Thus, the spectacle lens including the targeted water-and-oil repellent layer is obtained.

Meanwhile, in a case where the vacuum chamber includes the heat generating medium placed at only one position, in forming the water-and-oil repellent layer, at least one container in which material-filling spaces are formed at two or more positions may be placed on the heat generating medium in the vacuum chamber in a way that the material-filling spaces are different from each other in distance from the heat generating medium when the container is placed on the heat generating medium, and the first and the second fluorine-substituted alkyl group-containing organosilicon compounds may be stored respectively in the material-filling spaces so as to cause a time lag in the evaporation of the first and the second fluorine-substituted alkyl group-containing organosilicon compounds. To be more specific, the material-filling spaces are formed at two or more positions in at least one container which is placed on the heat generating medium in the vacuum chamber. When the container is placed on the heat generating medium, the distances from the heat generating medium to the respective the material-filling spaces are different from each other. The first fluorine-substituted alkyl group-containing organosilicon compound or a mixture thereof is stored in the filling space positioned closer to the heat generating medium. The second fluorine-substituted alkyl group-containing organosilicon compound or a mixture thereof is stored in the filling space farther from the heat generating medium. Thereby, a time lag can be caused in the evaporation of the different kinds of fluorine-substituted alkyl group-containing organosilicon compounds by a single simultaneous heating treatment.

Meanwhile, in such a case, the time lag in the evaporation starting time of the first fluorine-substituted alkyl group-containing organosilicon compound or a mixture thereof and the second fluorine-substituted alkyl group-containing organosilicon compound or a mixture thereof is determined by: the difference in distance between the material-filling space and the heat generating medium; and the difference in volatility between the first fluorine-substituted alkyl group-containing organosilicon compound or a mixture thereof and the second fluorine-substituted alkyl group-containing organosilicon compound or a mixture thereof, in other words, the difference between the average molecular weights of the two. For this reason, in the present invention, it is preferable that the filling space in which the second fluorine-substituted alkyl group-containing organosilicon compound is stored be positioned away from the heat generating medium. Moreover, it is preferable to select the second fluorine-substituted alkyl group-containing organosilicon compound whose average molecular weight is equivalent to or lower than the average molecular weight of the first fluorine-substituted alkyl group-containing organosilicon compound or a mixture thereof.

An example of the container having such material-filling spaces is a container shown in FIG. 1. FIG. 1 is a schematic cross-sectional view showing a state where the container for filling the material is placed on the heat generating medium when the spectacle lens of the present invention is produced by the vacuum deposition method. In the container shown in FIG. 1, material-filling spaces for filling the fluorine-substituted alkyl group-containing organosilicon compounds are formed at two positions; a filling space 1 is formed closer to a crucible bottom portion, and a filling space 2 is formed apart from the crucible bottom portion. Moreover, the container shown in FIG. 1 includes a crucible 4 in which the filling space 2 is formed, and a crucible 3 in which the filling space 1 is formed. Such a container is placed on a heat generating medium 5. The first fluorine-substituted alkyl group-containing organosilicon compound is filled in the filling space 1 closer to the crucible bottom portion, and the second fluorine-substituted alkyl group-containing organosilicon compound is filled in the filling space 2 apart from the crucible bottom portion. Thereby, a time lag can be caused in the evaporation of the two kinds of the materials. The difference between: the distance between the filling space 1 and the heat generating medium 5: as well as the distance between the filling space 2 and the heat generating medium 5 is determined in accordance with the difference in the evaporation temperature of the materials and the constitution of the targeted water-and-oil repellent layer. However, the difference can generally be set within a range of 2 to 10 mm.

Moreover, examples of the material of the crucibles 3, 4 include a metal and a ceramic material having a relatively high heat conductivity. Specifically, SUS, Cu, Mo, Ta, PBN, or the like is preferable.

EXAMPLES

Hereinafter, the present invention is more specifically described on the basis of Examples and Comparative Examples. However, the present invention is not limited to Examples described below.

Example 1

(1) Production of Anti-Reflection Film-Attached Lens

First, a plastic lens for spectacle was prepared as a lens base member, the plastic lens having a refractive index of 1.67, a spherical power (S degree) of −6.00 diopter, a cylindrical power (C degree) of −2.00 diopter, and an outer diameter of 80 mm. Then, a silicon-based hard coat layer having a refractive index of 1.67 was formed on the surface of the lens base member. Then, a multi-layered anti-reflection film was formed on the surface of the silicon-based hard coat layer by a vacuum deposition method to thereby obtain an anti-reflection film-attached lens. Note that the constitution of the multi-layered anti-reflection film was a five-layered film constitution, that is, $SiO_2/ZrO_2/SiO_2$ layers having a total optical thickness of $\lambda/4$; a $ZrO_2$ layer having a film thickness of $\lambda/4$; and a $SiO_2$ layer having a film thickness of $\lambda/4$ (where $\lambda=500$ nm) stacked in this sequence from the lens base member.

(2) Formation of Water-and-Oil Repellent Layer

First, 0.25 ml of OPTOOL AES4 (manufactured by DAIKIN INDUSTRIES, LTD.) was put into a stainless steel crucible having a content capacity of 4 ml, an inner diameter of 20 mm and a depth of 13 mm, and then heated at 50° C. for one hour to volatilize the solvent. Subsequently, this crucible was set on a resistance heating filament in a vacuum evaporator. The crucible was heated under conditions that: the degree of vacuum was $3 \times 10^{-5}$ Torr; and the applied current was 150 A. Thus, a first layer of a water-and-oil repellent layer was formed on the surface of the anti-reflection film-attached lens. Note that, in forming the first layer, the numerical value displayed on a quartz film-thickness gauge installed in the evaporator was recorded as the thickness of the first layer of the water-and-oil repellent layer.

Thereafter, 0.15 ml of KY-130 (manufactured by Shin-Etsu Chemical Co., Ltd.) was put into another stainless steel crucible having a content capacity of 4 ml, an inner diameter of 20 mm and a depth of 13 mm, and then heated at 50° C. for one hour to volatilize the solvent. Subsequently, this crucible was set on the resistance heating filament in the vacuum evaporator. The crucible was heated under the same conditions as those under which the first layer of the water-and-oil repellent layer was formed. Thus, a second layer of the water-and-oil repellent layer was formed on the surface of the anti-reflection film-attached lens on which the first layer of the water-and-oil repellent layer had been formed. Note that, in forming the second layer, the numerical value displayed on the quartz film-thickness gauge installed in the evaporator was recorded as the thickness of the second layer of the water-and-oil repellent layer.

After that, the anti-reflection film-attached lens on which the first layer and the second layer had been formed was taken out from the vacuum evaporator, and heated at 50° C. for one hour. Thereby, the water-and-oil repellent layer was stabilized, and a spectacle lens was obtained.

Example 2

A spectacle lens was obtained in a similar manner to Example 1, except that a mixture of 0.15 ml of OPTOOL AES4 (manufactured by DAIKIN INDUSTRIES, LTD.) and 0.1 ml of KY-130 (manufactured by Shin-Etsu Chemical Co., Ltd.) was used as the raw material of a first layer of a water-and-oil repellent layer instead of 0.25 ml of OPTOOL AES4 (manufactured by DAIKIN INDUSTRIES, LTD.). Note that the thicknesses of the first layer and a second layer of the water-and-oil repellent layer were measured by the same method as that in Example 1.

Example 3

First, 995 g of a fluorinated solvent (manufactured by Sumitomo 3M Limited, product name "Novec HFE-7200") was taken into a beaker. Then, 2.5 g of OPTOOL AES4 (manufactured by DAIKIN INDUSTRIES, LTD.) and 2.5 g of KY-130 (manufactured by Shin-Etsu Chemical Co., Ltd.) were introduced into the beaker and dissolved to obtain a solution having a water-and-oil repellent concentration of 0.1% by mass. Subsequently, an anti-reflection film-attached lens obtained by the same method as that in Example 1 was dipped into the solution for 10 seconds, thereafter pulled out from there at a speed of 8 mm/sec, and heated at 50° C. for one hour. Thereby, a water-and-oil repellent layer was stabilized, and a spectacle lens was obtained. Note that, as the thickness of the water-and-oil repellent layer, the film thickness of a sample was measured using ellipsometer MARY-102 (manufactured by FiveLab Co., Ltd.), the sample being obtained by forming a water-and-oil repellent layer on the surface of a silicon wafer under the same conditions as those described above. The value thus measured was recorded.

Example 4

First, an anti-reflection film-attached lens was produced in the same manner as in Example 1.

Thereafter, 0.15 ml of OPTOOL AES4 (manufactured by DAIKIN INDUSTRIES, LTD.) and 0.15 ml of KY-164 (manufactured by Shin-Etsu Chemical Co., Ltd.) were put into a stainless steel crucible having a content capacity 4 ml, an inner diameter of 20 mm and a depth of 13 mm, and then heated at 50° C. for one hour to volatilize the solvent. Subsequently, this crucible was set on a resistance heating filament in a vacuum evaporator. The crucible was heated under conditions that: the degree of vacuum is $3 \times 10^{-5}$ Torr; and the applied current was 150 A. Thus, a water-and-oil repellent layer was formed on the surface of the anti-reflection film-attached lens. Note that, in forming the water-and-oil repellent layer, the numerical value displayed on a quartz film-thickness gauge in an evaporator was recorded as the thickness of the water-and-oil repellent layer.

After that, the anti-reflection film-attached lens on which the water-and-oil repellent layer had been formed was taken out from the vacuum evaporator, and heated at 50° C. for one hour. Thereby, the water-and-oil repellent layer was stabilized, and a spectacle lens was obtained.

Example 5

First, 995 g of a fluorinated solvent (manufactured by Sumitomo 3M Limited, product name "Novec HFE-7200") was taken into a beaker. Then, 2.5 g of OPTOOL AES4 (manufactured by DAIKIN INDUSTRIES, LTD.) and 2.5 g of KY-164 (manufactured by Shin-Etsu Chemical Co., Ltd.) were introduced into the beaker and dissolved to obtain a solution having a water-and-oil repellent concentration of 0.1% by mass. Subsequently, an anti-reflection film-attached lens obtained in the same method as that in Example 1 was dipped into the solution for 10 seconds, thereafter pulled out from there at a speed of 8 mm/second, and heated at 50° C. for one hour. Thereby, a water-and-oil repellent layer was stabilized, and a spectacle lens was obtained. Note that, the thickness of the water-and-oil repellent layer was measured by the same method as that in Example 3.

Comparative Example 1

A spectacle lens for comparison was obtained in a similar manner to Example 1, except that a second layer of a water-and-oil repellent layer was not formed. Note that, the thickness of the water-and-oil repellent layer was measured by the same method as that in Example 1.

Comparative Example 2

A spectacle lens for comparison was obtained in a similar manner to Comparative Example 1, except that 0.3 ml of KY-130 (manufactured by Shin-Etsu Chemical Co., Ltd.) was used instead of 0.25 ml of OPTOOL AES4 (manufactured by DAIKIN INDUSTRIES, LTD.). Note that, the thickness of a water-and-oil repellent layer was measured in the same method as that in Example 1.

Example 6

First, an anti-reflection film-attached lens was produced in the same manner as in Example 1.

Thereafter, the stainless steel crucible (large) 3 having a content capacity of 4 ml, an inner diameter of 20 mm and a depth of 13 mm as well as the stainless steel crucible (small) 4 having a content capacity of 0.5 ml, an inner diameter of 8 mm and a bottom thickness of 5 mm, as shown in FIG. 1, were prepared. Then, 0.2 ml of OPTOOL AES4 manufactured by DAIKIN INDUSTRIES, LTD. was put into the filling space 1, and 0.1 ml of KY-130 manufactured by Shin-Etsu Chemical Co., Ltd. was put into the filling space 2. These were dried at 50° C. for one hour to evaporate the solvent.

Figure 2:
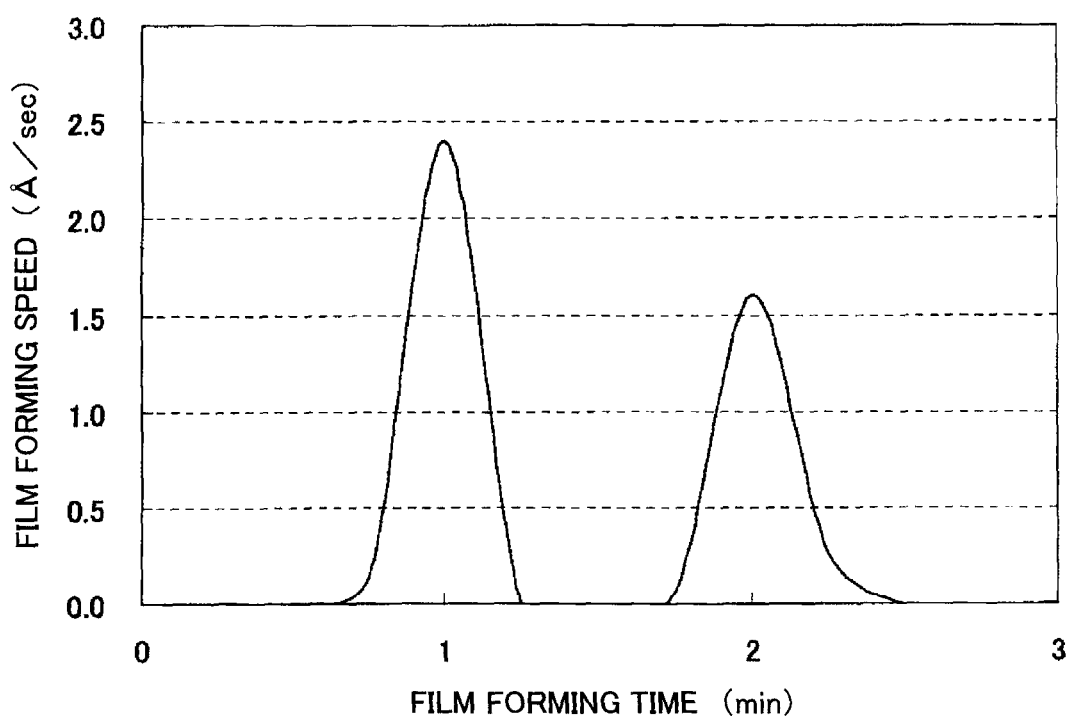
FIG. 2 is a graph showing a relationship between a film forming speed and a film forming time of a water-and-oil repellent layer in Example 6.

Subsequently, these crucibles 3, 4 were set on the resistance heating filament 5 in a vacuum evaporator as shown in FIG. 1. The crucibles 3, 4 were heated under conditions that: the degree of vacuum was $3 \times 10^{-5}$ Torr; and the applied current was 150 A. Thus, a water-and-oil repellent layer was formed on the surface of the anti-reflection film-attached lens. Note that, in forming the water-and-oil repellent layer, the film forming speed was recorded with a quartz film-thickness gauge installed in the evaporator. FIG. 2 shows the relationship between the film forming speed and the film forming time of the water-and-oil repellent layer. The numerical value displayed on the quartz film-thickness gauge was recorded as the thickness of the water-and-oil repellent layer. From these results, it was found out that OPTOOL AES4 was evaporated at first, and that KY-130 was evaporated approximately several tens of seconds after OPTOOL AES4 was evaporated completely.

After that, the anti-reflection film-attached lens on which the water-and-oil repellent layer had been formed was taken out from the vacuum evaporator, and heated at 50° C. for one hour. Thereby, the water-and-oil repellent layer was stabilized, and a spectacle lens was obtained.

Example 7

Figure 3:
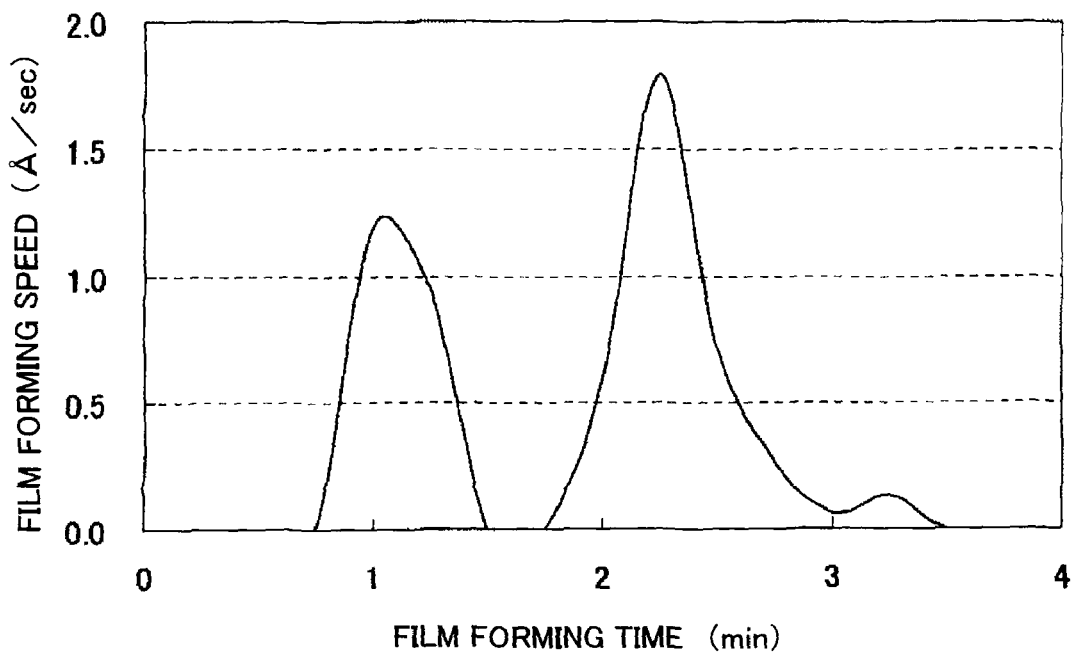
FIG. 3 is a graph showing a relationship between a film forming speed and a film forming time of a water-and-oil repellent layer in Example 7.

A spectacle lens was obtained in a similar manner to Example 6, except that 0.1 ml of KY-164 (manufactured by Shin-Etsu Chemical Co., Ltd.) was used instead of 0.1 ml of KY-130 (manufactured by Shin-Etsu Chemical Co., Ltd.). Note that, in forming a water-and-oil repellent layer, the film forming speed was recorded with a quartz film-thickness gauge installed in an evaporator. FIG. 3 shows the relationship between the film forming speed and the film forming time of the water-and-oil repellent layer. The numerical value displayed on the quartz film-thickness gauge was recorded as the thickness of the water-and-oil repellent layer. From these results, it was found out that OPTOOL AES4 was evaporated at first, and that KY-164 was evaporated approximately several tens of seconds after OPTOOL AES4 was evaporated completely.

Comparative Example 3

A spectacle lens for comparison was obtained in a similar manner to Example 6, except that 0.3 ml of OPTOOL AES4 manufactured by DAIKIN INDUSTRIES, LTD. was put into the filling space 1, and that no material was stored in the filling space 2. Note that the thickness of a water-and-oil repellent layer was measured by the same method as that in Example 6.

Comparative Example 4

A spectacle lens for comparison was obtained in a similar manner to Comparative Example 3, except that 0.3 ml of KY-130 (manufactured by Shin-Etsu Chemical Co., Ltd.) was used instead of 0.3 ml of OPTOOL AES4 (manufactured by DAIKIN INDUSTRIES, LTD.). Note that the thickness of a water-and-oil repellent layer was measured by the same method as that in Example 6.

<Edge Processability Evaluation>

Edge processings were performed on the spectacle lenses obtained in Examples 1 to 7 and Comparative Examples 1 to 4 as test samples by an edge processing method described in Japanese Unexamined Patent Application Publication No. 2004-347660 (JP 2004-347660 A) and by an edge processing method described in International Publication No. 2006/93113 (WO 2006/93113 A). The edge processability of the spectacle lenses were evaluated by the methods shown below.

(1) Edge Processing Method Using Silicon Adhesive-Attached Tape (JP 2004-347660 A)

Figure 4:
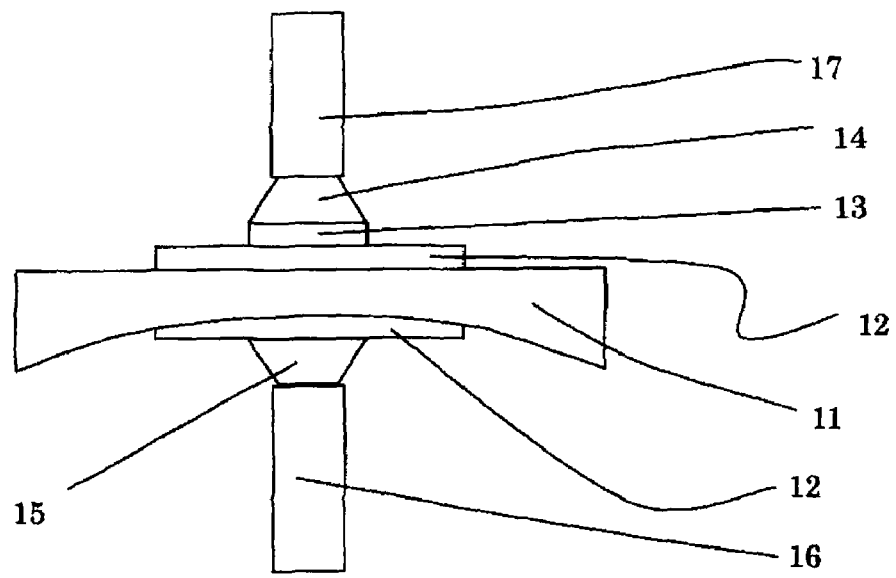
FIG. 4 is a schematic cross-sectional view showing one embodiment of an edge processing method for a spectacle lens using a silicon adhesive-attached tape.

An edge processing was performed on the spectacle lenses by an edge processing method as shown in FIG. 4. Specifically, first, three points on a straight line including a point passing through the optical center were marked on the convex surface of a spectacle lens 11 with a lens meter. Then, a straight line passing through, when viewed from the concave surface of the spectacle lens 11, the three points marked on the convex surface and a straight line passing through the optical center (lens-lock central point) to go straight to that straight line were drawn on the concave surface with a cutter.

Subsequently, silicon adhesive-attached polyester film tapes 12 (manufactured by Sumitomo 3M Limited, film thickness: 40 μm) each having an elliptic shape with a major axis of 40 mm and a minor axis of 30 mm were pasted on both surfaces of the spectacle lens 11. Thereafter, a lens lock cap 14 was pasted on the surface of the polyester film tape 12 at the convex surface side with a lens lock tape 13 (LEAP III, manufactured by Sumitomo 3M Limited). After that, the spectacle lens 11 was interposed between an edging-machine processing shaft 16 with a back-surface receiver 15 fitted thereinto and another edging-machine processing shaft 17. Then, the edge processing was performed.

Note that the edge processing was performed under conditions shown as follows. Specifically, as an edging machine, LE9000 SX (manufactured by NIDEK CO., LTD., a normal loading machine provided with a single grinding stone therein) was used. Moreover, the chuck pressure value was set to 60 kg. Furthermore, as the lens shape, Nikon Clasio (product number 9018, having an approximately octagonal shape with a breadth of 48 mm and a height of 30 mm) was employed. In addition, an eccentric distance in the processing was set to 5 mm in a horizontal direction, and to 2 mm in an upward direction. Furthermore, as the lens lock cap 14, a minimum-size cap (hard plastic material with a height of 17 mm) manufactured by NIDEK CO., LTD. was used.

(2) Edge Processing Method Using Protection Film for Edging Process (WO 2006/93113 A)

Figure 5:
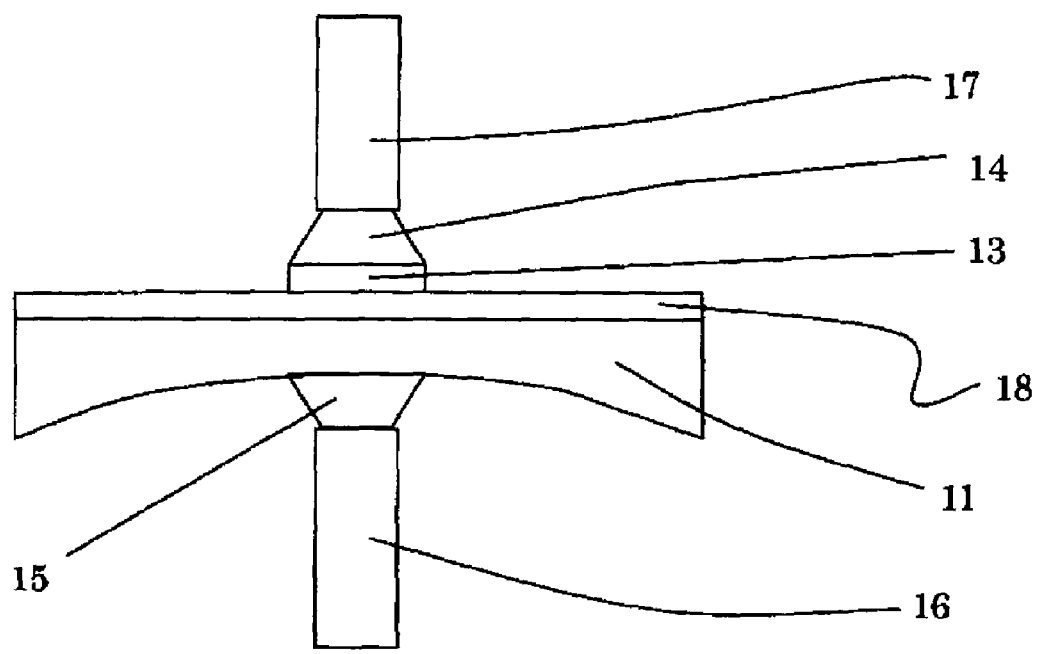
FIG. 5 is a schematic cross-sectional view showing one embodiment of an edge processing method for a spectacle lens using a protection film for the edge processing.

An edge processing was performed on the spectacle lenses by an edge processing method as shown in FIG. 5. Specifically, first, 50 parts by mass of S-LEC BM-5 (manufactured by SEKISUI CHEMICAL CO., Ltd.) was dissolved in a mixed solution of 150 parts by mass of methanol and 150 parts by mass of 1-methoxy-2-propanol (manufactured by Wako Pure Chemical Industries, Ltd.). Methanol silica sol (manufactured by NISSAN CHEMICAL INDUSTRIES, Ltd., solid content: 30% by mass) was further added thereto and thoroughly stirred. Thereby, a protection-film coating solution was obtained.

Subsequently, while a spectacle lens 1 is being rotated at 300 RPM, a central portion of the lens on the convex surface side (one side) of the spectacle lens 11 was coated with 5 ml of the protection-film coating solution. The spectacle lens 11 was continued to be rotated for 15 seconds. Thereafter, the spectacle lens 11 was rotated at a revolution of 1500 RPM for 10 seconds, and the coated film was dried for one day. Thereby, an edge-processing protection film 18 was formed on the convex surface side (one side) of the spectacle lens 11.

After that, three points on a straight line including a point passing through the optical center were marked on the edge-processing protection film 18 with a lens meter. Then, a straight line passing through, when viewed from the concave surface of the spectacle lens 11, the three points marked on the convex surface and a straight line passing through the optical center to go straight to that straight line were drawn on the concave surface with a cutter.

Subsequently, a lens lock cap 14 was pasted on the surface of the edge-processing protection film 18 with a lens lock tape 13 (LEAP III, manufactured by Sumitomo 3M Limited). Thereafter, the spectacle lens 11 was interposed between an edging-machine processing shaft 16 with a back-surface receiver 15 fitted thereinto and another edging-machine processing shaft 17. Then, the edge processing was performed. Note that the edge processing was performed under the same conditions as the edge processing conditions for the aforementioned edge processing method using the silicon adhesive-attached tape.

(3) Edge Processability Evaluation Method

Figure 6:
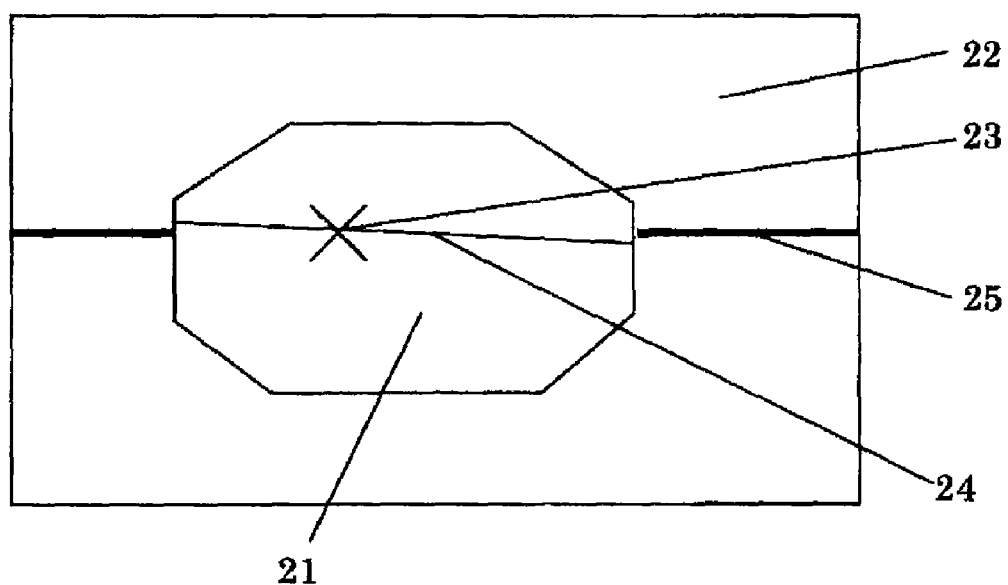
FIG. 6 is a schematic cross-sectional view showing one embodiment of a method for measuring an axis deviation caused when the edge processing is performed.

The edge Processability was judged by evaluating or measuring the shape of processed lenses and the axis deviation amount. Specifically, the shape of the processed lenses was visually observed. Meanwhile, the axis deviation amount resulted from the edge processing was measured with a profile projector manufactured by NIKON CORPORATION. To be more specific, as shown in FIG. 6, a processed lens 21 was fitted into a mold plate 22; the axis deviation amount of a straight line 24 passing through a lens-lock central point 23 that had been already provided on the concave surface of the lens was measured with reference to an axis-deviation measuring reference line 25 provided on the mold plate 22. Note that, the edge processability was judged on the basis of the shape of processed lenses and the axis deviation amount in accordance with the following criteria.

o: the targeted edging-mold shape was obtained, and the axis deviation was 1.5° or less.

Δ: although the targeted edging-mold shape was obtained, the axis deviation exceeded 1.5°.

x: the axis deviation greatly exceeded 1.5°, and the targeted edging-mold shape was not obtained at all.

<Evaluations of Water-and-Oil Repellency and its Durability>

The water-and-oil repellency and its durability of each spectacle lens obtained in Examples 1 to 7 and Comparative Examples 1 to 4 were evaluated by the methods shown below. Specifically, first, the edge-processing protection film was formed on the convex surface of the spectacle lens by the same method as the above-described edge processing method using the edging protection film. After one day elapsed, this protection film was separated. Then, measurement of the contact angle with water and an ink test, which are described below, were performed on the water-and-oil repellent layer on the convex surface of this spectacle lens. Thus, the water-and-oil repellency of the spectacle lens was evaluated. Moreover, the durability test was performed in which the water-and-oil repellent layer on the convex surface of this spectacle lens was rubbed up to 5000 times in total at a rubbing speed of 90 times/min with a pause per 1000 times while an eyewear cloth (manufactured by Pearl Corporation, product name "Dot Clean") is being applied with a load of 200 g. Furthermore, the water-and-oil repellent layer on the convex surface of the spectacle lens during the durability test and after the durability test was subjected to the measurement of the contact angle with water and the ink test as shown below. Thus, the durability of the water-and-oil repellency of the spectacle lens was evaluated.

(1) Measurement of Contact Angle with Water

The contact angles with water before the rubbing with the eyewear cloth (initial time) and after the 5000-time rubbing (after the durability test) were measured with a contact angle meter, CA-D model, manufactured by Kyowa interface Science CO., LTD.

(2) Ink Test

The degree of ink repelling was visually observed after a straight line of approximately 3 cm was drawn on the water-and-oil repellent layer on the convex surface of the spectacle lens with a black oil-based marker (manufactured by ZEBRA CO., Ltd., product name "Hi-Mckee") before the rubbing with the eyewear cloth (initial time). Then, it was judged as "A" in a case where the drawn ink was repelled in the form of dots, and judged as "B" in a case where the ink was drawn in a line without repelling. Additionally, such an ink test was performed every 1000 times the water-and-oil repellent layer on the convex surface of the spectacle lens was rubbed with the eyewear cloth during the durability test. The number of rubbing times with the eyewear cloth, during which the performance of "A" was maintained, was also determined.

<Evaluation Results>

Table 1 shows the evaluation results of the edge processability, the water-and-oil repellency and its durability of each spectacle lens obtained in Examples 1 to 5 and Comparative Examples 1, 2 as well as the thickness of each water-and-oil repellent layer of the spectacle lens obtained in Examples 1 to 5 and Comparative Examples 1, 2. Meanwhile, Table 2 shows the evaluation results of the edge processability, the water-and-oil repellency and its durability of each spectacle lens obtained in Examples 6, 7 and Comparative Examples 3, 4 as well as the thickness of each water-and-oil repellent layer of the spectacle lens obtained in Examples 6, 7 and Comparative Examples 3, 4.

TABLE 1

|  | Thickness of water-and-oil repellent layer (nm) | Water-and-oil repellency and its durability | | | | Edge processability | |
|---|---|---|---|---|---|---|---|
|  |  | Contact angle (water) initial time | Contact angle (water) after 5000-time durability test | Ink test initial time | Ink test durability | With tape *1 | With protection film *2 |
| Example 1 | 20 | 109.8 | 109.5 | A | 5000 times or more | ○ | ○ |
| Example 2 | 20 | 108.7 | 108.1 | A | 4000 times | ○ | ○ |
| Example 3 | 8 | 109.5 | 108.6 | A | 4000 times | ○ | ○ |
| Example 4 | 14 | 109.2 | 108.5 | A | 5000 times or more | ○ | ○ |
| Example 5 | 8 | 109.0 | 108.4 | A | 5000 times or more | ○ | ○ |

TABLE 1-continued

| | Water-and-oil repellency and its durability | | | | | Edge processability | |
|---|---|---|---|---|---|---|---|
| | Thickness of water-and-oil repellent layer (nm) | Contact angle (water) initial time | Contact angle (water) after 5000-time durability test | Ink test initial time | Ink test durability | With tape *1 | With protection film *2 |
| Comparative Example 1 | 15 | 112.3 | 111.3 | A | 5000 times or more | X | Δ |
| Comparative Example 2 | 13 | 107.8 | 105.6 | A | 1000 times or less | ○ | ○ |

*1 shows the edge processing method described in JP 2004-347660 A
*2 shows the edge processing method described in WO 2006/93113 A

TABLE 2

| | Water-and-oil repellency and its durability | | | | | Edge processability | |
|---|---|---|---|---|---|---|---|
| | Thickness of water-and-oil repellent layer (nm) | Contact angle (water) initial time | Contact angle (water) after 5000-time durability test | Ink test initial time | Ink test durability | With tape *3 | With protection film *4 |
| Example 6 | 14 | 109.6 | 109.2 | A | 5000 times or more | ○ | ○ |
| Example 7 | 14 | 110.1 | 109.8 | A | 5000 times or more | ○ | ○ |
| Comparative Example 3 | 15 | 112.3 | 111.3 | A | 5000 times or more | X | Δ |
| Comparative Example 4 | 13 | 107.8 | 105.6 | A | 1000 times or less | ○ | ○ |

*3 shows the edge processing method described in JP 2004-347660 A
*4 shows the edge processing method described in WO 2006/93113 A As apparent from the results shown in Table 1 and Table 2, the spectacle lenses (Examples 1 to 7) of the present invention were excellent in the edge processability, the water-and-oil repellency and its durability. Therefore, it was proved that the spectacle lens of the present invention is capable of retaining a sufficient water-and-oil repellency over an extended period, and has a sufficient edge processability.

As has been described above, according to the present invention, it is possible to provide: a spectacle lens capable of retaining a sufficient water-and-oil repellency over an extended period, furthermore the spectacle lens having a sufficient edge processability; and a method for producing the spectacle lens.

What is claimed is:

1. A spectacle lens comprising:

a lens base member;

a multi-layered anti-reflection film placed on the lens base member, and including a layer mainly made of silicon dioxide as an outermost layer; and a water-and-oil repellent layer provided in contact with the outermost layer of the multi-layered anti-reflection film, and made by using, as raw materials: at least one kind of a first fluorine-substituted alkyl group-containing organosilicon compound; and a second fluorine-substituted alkyl group-containing organosilicon compound, the first fluorine-substituted alkyl group-containing organosilicon compound being selected from the group consisting of a fluorine-substituted alkyl group-containing organosilicon compound expressed by the following general formula (1):

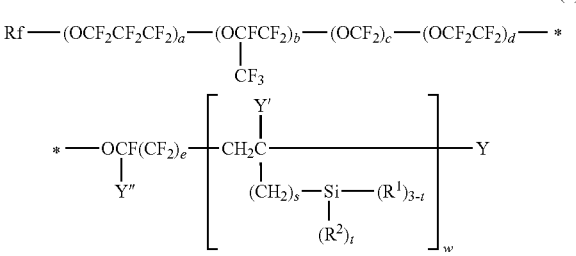

in the formula (1): Rf represents a straight or branched perfluoroalkyl group having 1 to 16 carbon atoms; Y represents any one of iodine and hydrogen; Y' represents any one of hydrogen and a lower alkyl group; Y" represents any one of fluorine and a trifluoromethyl group; $R^1$ represents a hydrolyzable group; $R^2$ represents any one of hydrogen and an inactive monovalent organic group; a, b, c, and d each represent an integer of 0 to 200; e represents any one of 0 and 1; s and t each represent an integer of 0 to 2; and w represents an integer of 1 to 10 and fluorine-substituted alkyl group-containing organosilicon compounds expressed by the following general formulae (2) to (5):

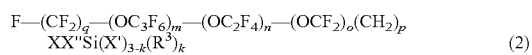

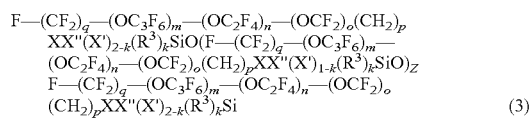

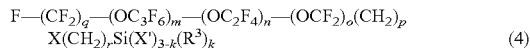

$$F-(CF_2)_q-(OC_3F_6)_m-(OC_2F_4)_n-(OCF_2)_o(CH_2)_p \\ X(CH_2)_rSi(X')_{3-k}(R^3)_k \tag{4}$$

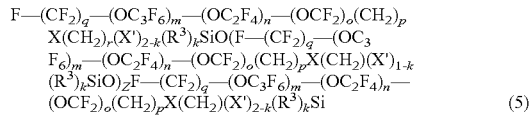

$$F-(CF_2)_q-(OC_3F_6)_m-(OC_2F_4)_n-(OCF_2)_o(CH_2)_p \\ X(CH_2)_r(X')_{2-k}(R^3)_kSiO(F-(CF_2)_q-(OC_3 \\ F_6)_m-(OC_2F_4)_n-(OCF_2)_o(CH_2)_pX(CH_2)(X')_{1-k} \\ (R^3)_kSiO)_ZF-(CF_2)_q-(OC_3F_6)_m-(OC_2F_4)_n- \\ (OCF_2)_o(CH_2)_pX(CH_2)(X')_{2-k}(R^3)_kSi \tag{5}$$

in the formulae (2) to (5): X represents any one of oxygen and a divalent organic group; X' represents a hydrolyzable group; X" represents a divalent organosilicone group; $R^3$ represents a straight or branched alkylene group having 1 to 22 carbon atoms; q represents an integer of 1 to 3; m, n, and o each represent an integer of 0 to 200; p represents any one of 1 and 2; r represents an integer of 2 to 20; k represents an integer of 0 to 2; and z represents an integer of 0 to 10 with the proviso that k is any one of 0 and 1, and the second fluorine-substituted alkyl group-containing organosilicon compound being expressed by the following general formula (6):

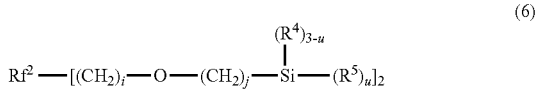

$$Rf^2-[(CH_2)_i-O-(CH_2)_j-\overset{(R^4)_{3-u}}{\underset{|}{Si}}-(R^5)_u]_2 \tag{6}$$

in the formula (6): $Rf^2$ represents a divalent straight perfluoropolyether group; $R^4$ represents anyone of a phenyl group and an alkyl group having 1 to 4 carbon atoms; $R^5$ represents a hydrolyzable group; i represents an integer of 0 to 2; j represents an integer of 1 to 5; and u represents any one of 2 and 3.

2. The spectacle lens according to claim 1, wherein the water-and-oil repellent layer includes:
a first layer provided in contact with the outermost layer of the multi-layered anti-reflection film, and made by using the first fluorine-substituted alkyl group-containing organosilicon compound as a main raw material; and
a second layer provided in contact with the first layer, and made by using the second fluorine-substituted alkyl group-containing organosilicon compound as a main raw material.

3. The spectacle lens according to claim 1, further comprising:
either a hard coat layer, or a primer layer and a hard coat layer, between the lens base member and the multi-layered anti-reflection film.

4. The spectacle lens according to claim 1, wherein the first and the second fluorine-substituted alkyl group-containing organosilicon compounds each have an average molecular weight of 1000 to 10000.

5. The spectacle lens according to claim 1, wherein the water-and-oil repellent layer has a thickness of 5 to 30 nm.

6. A method for producing a spectacle lens comprising the steps of:
obtaining an anti-reflection film-attached lens by forming a multi-layered anti-reflection film on a lens base member, the multi-layered anti-reflection film including a layer mainly made of silicon dioxide as an outermost layer; and
forming a water-and-oil repellent layer on the anti-reflection film-attached lens, the water-and-oil repellent layer being made by using, as raw materials: at least one kind of a first fluorine-substituted alkyl group-containing organosilicon compound; and a second fluorine-substituted alkyl group-containing organosilicon compound,
the first fluorine-substituted alkyl group-containing organosilicon compound being selected from the group consisting of a fluorine-substituted alkyl group-containing organosilicon compound expressed by the following general formula (1):

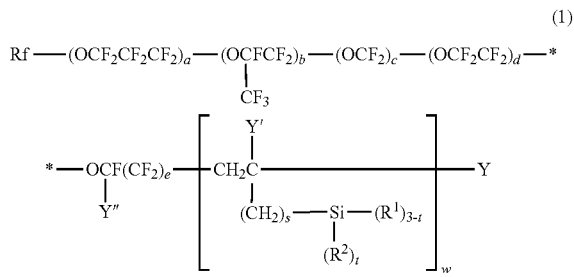

in the formula (1): Rf represents a straight or branched perfluoroalkyl group having 1 to 16 carbon atoms; Y represents any one of iodine and hydrogen; Y' represents any one of hydrogen and a lower alkyl group; Y" represents any one of fluorine and a trifluoromethyl group; $R^1$ represents a hydrolyzable group; $R^2$ represents any one of hydrogen and an inactive monovalent organic group; a, b, c, and d each represent an integer of 0 to 200; e represents any one of 0 and 1; s and t each represent an integer of 0 to 2; and w represents an integer of 1 to 10 and fluorine-substituted alkyl group-containing organosilicon compounds expressed by the following general formulae (2) to (5):

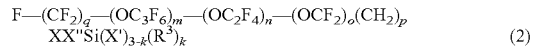

$$F-(CF_2)_q-(OC_3F_6)_m-(OC_2F_4)_n-(OCF_2)_o(CH_2)_p \\ XX''Si(X')_{3-k}(R^3)_k \tag{2}$$

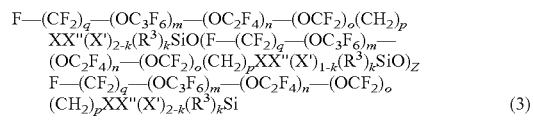

$$F-(CF_2)_q-(OC_3F_6)_m-(OC_2F_4)_n-(OCF_2)_o(CH_2)_p \\ XX''(X')_{2-k}(R^3)_kSiO(F-(CF_2)_q-(OC_3F_6)_m- \\ (OC_2F_4)_n-(OCF_2)_o(CH_2)_pXX''(X')_{1-k}(R^3)_kSiO)_Z \\ F-(CF_2)_q-(OC_3F_6)_m-(OC_2F_4)_n-(OCF_2)_o \\ (CH_2)_pXX''(X')_{2-k}(R^3)_kSi \tag{3}$$

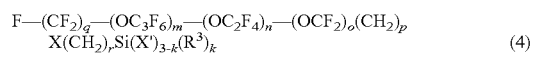

$$F-(CF_2)_q-(OC_3F_6)_m-(OC_2F_4)_n-(OCF_2)_o(CH_2)_p \\ X(CH_2)_rSi(X')_{3-k}(R^3)_k \tag{4}$$

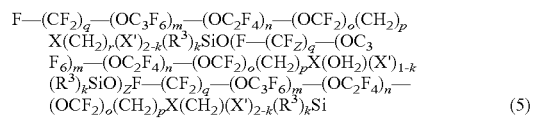

$$F-(CF_2)_q-(OC_3F_6)_m-(OC_2F_4)_n-(OCF_2)_o(CH_2)_p \\ X(CH_2)_r(X')_{2-k}(R^3)_kSiO(F-(CF_Z)_q-(OC_3 \\ F_6)_m-(OC_2F_4)_n-(OCF_2)_o(CH_2)_pX(OH_2)(X')_{1-k} \\ (R^3)_kSiO)_ZF-(CF_2)_q-(OC_3F_6)_m-(OC_2F_4)_n- \\ (OCF_2)_o(CH_2)_pX(CH_2)(X')_{2-k}(R^3)_kSi \tag{5}$$

in the formulae (2) to (5): X represents any one of oxygen and a divalent organic group; X' represents a hydrolyzable group; X" represents a divalent organosilicone group; $R^3$ represents a straight or branched aikylene group having 1 to 22 carbon atoms; q represents an integer of 1 to 3; m, n, and o each represent an integer of 0 to 200; p represents any one of 1 and 2; r represents an integer of 2 to 20; k represents an integer of 0 to 2; and z represents an integer of 0 to 10 with the proviso that k is any one of 0 and 1, and the second fluorine-substituted alkyl group-containing organosilicon compound being expressed by the following general formula (6):

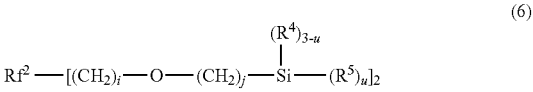

$$Rf^2-[(CH_2)_i-O-(CH_2)_j-\overset{(R^4)_{3-u}}{\underset{|}{Si}}-(R^5)_u]_2 \tag{6}$$

in the formula (6): $Rf^2$ represents a divalent straight perfluoropolyether group; $R^4$ represents any one of a phenyl group and an alkyl group having 1 to 4 carbon atoms; $R^5$ represents a hydrolyzable group; i represents an integer of 0 to 2; j represents an integer of 1 to 5; and u represents any one of 2 and 3.

7. The method for producing a spectacle lens according to claim 6, wherein,
the step of forming the water-and-oil repellent layer is a step of forming the water-and-oil repellent layer by preparing a solution containing the first fluorine-substituted alkyl group-containing organosilicon compound and the second fluorine-substituted alkyl group-containing organosilicon compound; by coating a surface of the anti-reflection film-attached lens with the solution; and by drying the surface.

8. The method for producing a spectacle lens according to claim 6, wherein
the step of forming the water-and-oil repellent layer is a step of forming the water-and-oil repellent layer on a surface of the anti-reflection film-attached lens by evaporating the first fluorine-substituted alkyl group-containing organosilicon compound and the second fluorine-substituted alkyl group-containing organosilicon compound in a vacuum chamber.

9. The method for producing a spectacle lens according to claim 6, wherein
the step of forming the water-and-oil repellent layer is a step of forming, on a surface of the anti-reflection film-attached lens, the water-and-oil repellent layer including a first layer made by using the first fluorine-substituted alkyl group-containing organosilicon compound as a main raw material, and a second layer made by using the second fluorine-substituted alkyl group-containing organosilicon compound as a main raw material, by evaporating the first fluorine-substituted alkyl group-containing organosilicon compound in a vacuum chamber to thereby form the first layer on the surface of the anti-reflection film-attached lens; and then by evaporating the second fluorine-substituted alkyl group-containing organosilicon compound in the vacuum chamber to thereby form the second layer on a surface of the first layer.

10. The method for producing a spectacle lens according to claim 6, wherein
a surface of the lens base member is provided with:
a hard coat layer; or
a primer layer and a hard coat layer.

11. A method for producing a spectacle lens that comprises:
a lens base member;
a multi-layered anti-reflection film placed on the lens base member, and including a layer mainly made of silicon dioxide as an outermost layer; and
a water-and-oil repellent layer provided in contact with the outermost layer of the multi-layered anti-reflection film, and made by using at least two kinds of fluorine-substituted alkyl group-containing organosilicon compounds as raw materials, the method comprising the steps of:
obtaining an anti-reflection film-attached lens by forming the multi-layered anti-reflection film on the lens base member; and
forming, on a surface of the anti-reflection film-attached lens, the water-and-oil repellent layer including a first layer made by using a first fluorine-substituted alkyl group-containing organosilicon compound as a main raw material, and a second layer made by using a second fluorine-substituted alkyl group-containing organosilicon compound as a main raw material, by evaporating the first and the second fluorine-substituted alkyl group-containing organosilicon compounds in a vacuum chamber sequentially with a certain time lag to thereby form the first layer on a surface of the anti-reflection film-attached lens, and to form the second layer on a surface of the first layer;
wherein,
in forming the water-and-oil repellent layer,
at least one container is placed on a heat generating medium in the vacuum chamber, the container including material-filling spaces which are formed at two or more positions different in distance from the heat generating medium when the container is placed on the heat generating medium, and
the first and the second fluorine-substituted alkyl group-containing organosilicon compounds are stored respectively in the material-filling spaces so as to cause a time lag in the evaporation of the first and the second fluorine-substituted alkyl group-containing organosilicon compounds.

12. The method for producing a spectacle lens according to claim 11, wherein the first fluorine-substituted alkyl group-containing organosilicon compound is at least one kind selected from the group consisting of a fluorine substituted alkyl group-containing organosilicon compound expressed by the following general formula (1):

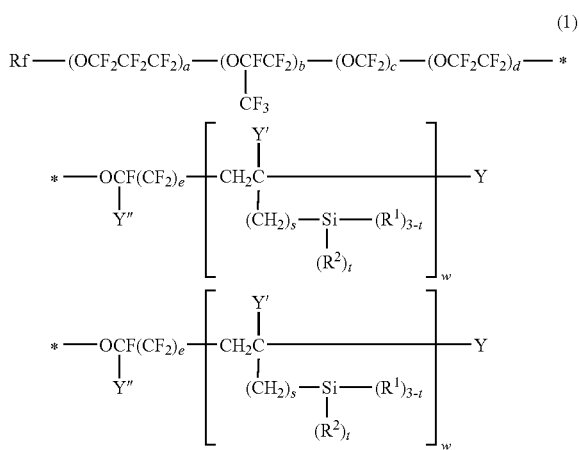

in the formula (1): Rf represents a straight or branched perfluoroalkyl group having 1 to 16 carbon atoms; Y represents any one of iodine and hydrogen; Y' represents any one of hydrogen and a lower alkyl group; Y'' represents any one of fluorine and a trifluoromethyl group; $R^1$ represents a hydrolyzable group; $R^2$ represents any one of hydrogen and an inactive monovalent organic group; a, b, c, and d each represent an integer of 0 to 200; e represents any one of 0 and 1; s and t each represent an integer of 0 to 2; and w represents an integer of 1 to 10,
and fluorine-substituted alkyl group-containing organosilicon compounds expressed by the following general formulae (2) to (5);

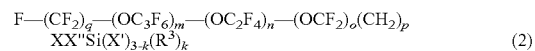

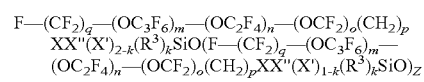

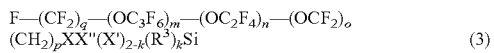  (3)

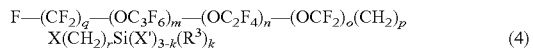  (4)

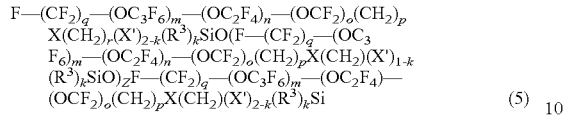  (5)

in the formulae (2) to (5): X represents any one of oxygen and a divalent organic group; X' represents a hydrolyzable group; X" represents a divalent organosilicone group; $R^3$ represents a straight or branched alkylene group having 1 to 22 carbon atoms; q represents an integer of 1 to 3; m, n, and o each represent an integer of 0 to 200; p represents any one of 1 and 2; r represents an integer of 2 to 20; k represents an integer of 0 to 2; and z represents an integer of 0 to 10 with the proviso that k is any one of 0 and 1.

13. The method for producing a spectacle lens according to claim 11, wherein the second fluorine-substituted alkyl group-containing organosilicon compound is expressed by the following general formula (6):

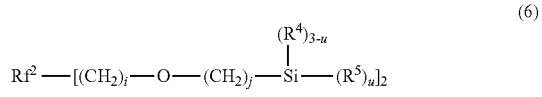  (6)

in the formula (6): Re represents a divalent straight perfluoropolyethe.r group; $R^1$ represents any one of a phenyl group and an alkyl group having 1 to 4 carbon atoms; $R^5$ represents a hydrolyzable group; i represents an integer of 0 to 2; j represents an integer of 1 to 5; and u represents any one of 2 and 3.

* * * * *